United States Patent
Roh et al.

(10) Patent No.: US 8,568,929 B2
(45) Date of Patent: Oct. 29, 2013

(54) ELECTRODE ASSEMBLY INCLUDING SEPARATORS HAVING CROSSING PORES AND RECHARGEABLE BATTERY

(75) Inventors: Sae-Weon Roh, Suwon-si (KR); Sung-Soo Kim, Suwon-si (KR); Tae-Keun Kim, Suwon-si (KR); Jin-Kyu Hong, Suwon-si (KR); Jun-Sik Kim, Suwon-si (KR); Man-Seok Han, Suwon-si (KR); Nam-Soon Choi, Suwon-si (KR); Chong-Hoon Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 346 days.

(21) Appl. No.: 12/638,828

(22) Filed: Dec. 15, 2009

(65) Prior Publication Data

US 2011/0052952 A1 Mar. 3, 2011

Related U.S. Application Data

(60) Provisional application No. 61/239,319, filed on Sep. 2, 2009.

(51) Int. Cl.
- *H01M 2/04* (2006.01)
- *H01M 2/06* (2006.01)
- *H01M 2/08* (2006.01)
- *H01M 4/00* (2006.01)

(52) U.S. Cl.
USPC ........... 429/246; 429/247; 429/185; 429/179; 429/94

(58) Field of Classification Search
USPC ............ 429/94, 185, 136, 60, 223, 224, 246, 429/179, 62, 206, 249
See application file for complete search history.

(56) References Cited

U.S. PATENT DOCUMENTS

| | | | | |
|---|---|---|---|---|
| 2,988,585 A | * | 6/1961 | Peters | 429/60 |
| 3,121,658 A | * | 2/1964 | Orsino et al. | 429/249 |
| 5,069,990 A | * | 12/1991 | Yoshimura et al. | 429/206 |
| 5,691,077 A | * | 11/1997 | Yu | 429/62 |
| 2009/0317702 A1 | * | 12/2009 | He et al. | 429/136 |

FOREIGN PATENT DOCUMENTS

| | | |
|---|---|---|
| CN | 200997421 A | 12/2007 |
| JP | 59-012559 | 1/1984 |
| JP | 63-126159 | 5/1988 |
| JP | 08-045546 | 2/1996 |
| JP | 08-045547 | 2/1996 |

(Continued)

OTHER PUBLICATIONS

Machine Translation of: JP 11/040184 A1, Tsukamoto, Feb. 12, 1999.*

(Continued)

*Primary Examiner* — Kenneth Douyette
(74) *Attorney, Agent, or Firm* — Christie, Parker & Hale, LLP (57) ABSTRACT

An electrode assembly and a rechargeable battery having an electrode assembly. An electrode assembly for a rechargeable battery includes a first electrode; a second electrode; a first separator between the first electrode and the second electrode, the first separator having a plurality of first pores, each of the first pores elongated in a first direction; and a second separator on an opposite side of the first electrode from the first separator, the second separator having a plurality of second pores, each of the second pores elongated in a second direction crossing the first direction.

23 Claims, 6 Drawing Sheets

(56) References Cited

FOREIGN PATENT DOCUMENTS

| | | |
|---|---|---|
| JP | 10-162803 | 6/1998 |
| JP | 11-040184 | 2/1999 |
| JP | 2004-349174 | 12/2004 |
| JP | 2005-346987 | 12/2006 |
| JP | 2007-242348 | 9/2007 |
| JP | 2007-280724 | 10/2007 |
| JP | 2008-108464 | 5/2008 |
| KR | 10-2001-0048097 | 6/2001 |
| WO | WO 2008/074239 A1 | 6/2008 |

OTHER PUBLICATIONS

Machine Translation of: KR 1020010048097 A1, Kim et al., Jun. 15, 2001.*

"Trilayer Polypropylene/Polyethylene PP/PE/PP", Celgard Product Datasheet, retrieved online on Jul. 16, 2012 from: http://www.celgard.com/Trilayer-PP.aspx.*

European Search Report dated Feb. 24, 2010, for corresponding European application 09179753.0.

KIPO Notice of Allowance dated Mar. 27, 2012, for corresponding Korean Patent application 10-2009-0132201, 5 pages.

Japanese Office action dated Sep. 11, 2012, for corresponding Japanese Patent application 2010-142587, (3 pages).

Patent Abstracts of Japan, and English machine translation of Japanese Publication 08-045546 listed above, (5 pages).

Patent Abstracts of Japan, and English machine translation of Japanese Publication 08-045547 listed above, (5 pages).

Patent Abstracts of Japan, and English machine translation of Japanese Publication 2005-346987 listed above, (16 pages).

SIPO Office action dated Jan. 28, 2013, for corresponding Chinese Patent application 201010180002.5, with English translation, (16 pages).

JPO Office action dated Jun. 11, 2013, for corresponding Japanese Patent application 2010-142587, (5 pages).

Patent Abstracts of Japan, and English machine translation of Japanese Publication 2004-349174 dated Dec. 9, 2004, listed above (11 pages).

Patent Abstracts of Japan, and English machine translation of Japanese Publication 2008-108464 dated May 8, 2008, listed above (20 pages).

SIPO Office action dated Jul. 17, 2013, with English translation, for corresponding Chinese Patent application 201010180002.5, (15 pages).

* cited by examiner

ELECTRODE ASSEMBLY INCLUDING SEPARATORS HAVING CROSSING PORES AND RECHARGEABLE BATTERY

CROSS-REFERENCE TO RELATED APPLICATION

This application claims priority to and the benefit of U.S. Provisional Patent Application No. 61/239,319 filed on Sep. 2, 2009, the entire content of which is incorporated herein by reference.

BACKGROUND

1. Field

Aspects of embodiments of the present invention relate to an electrode assembly and a rechargeable battery having an electrode assembly.

2. Description of the Related Art

Unlike a primary battery that cannot be recharged, a rechargeable battery can be repeatedly charged and discharged. Low-capacity rechargeable batteries are used for portable compact electronic apparatuses such as mobile phones, notebook computers, and camcorders, and high-capacity rechargeable batteries are widely used as a power source for driving a motor of a hybrid vehicle or for other desired applications.

Recently, a high-output rechargeable battery using a non-aqueous electrolyte having high energy density has been developed. The high-output rechargeable battery is configured with high capacity by connecting a plurality of unit rechargeable batteries in series so as to be used for driving a motor for an apparatus requiring a large amount of power (e.g., an electrical vehicle).

In addition, one large-capacity rechargeable battery is formed of a plurality of rechargeable batteries coupled in series, and the rechargeable battery may be formed in a cylindrical, prismatic, or pouch shape.

The electrode assembly includes a positive electrode, a negative electrode, and a separator disposed between the positive and negative electrodes. Here, the separator separates the positive electrode and the negative electrode to prevent a short-circuit, and absorbs electrolyte solution required for battery reaction to maintain high ion conductivity.

In order to maintain a stable output, the separator should absorb a sufficient amount of electrolyte solution. However, while charging and discharging are repeated, the positive and negative electrodes expand so that the electrolyte solution in the separator is externally squeezed out.

As described, when a sufficient amount of electrolyte solution is not contained in the separator, ion movement is improperly performed so that an output is deteriorated and life-span of the rechargeable battery is shortened due to degradation of the electrode assembly.

The above information disclosed in this Background section is provided only for enhancement of understanding of the background of the invention and therefore it may contain information that does not form the prior art that is already known in this country to a person of ordinary skill in the art.

SUMMARY

Aspects of embodiments of the present invention provide an electrode assembly configured to facilitate electrolyte solution replacement and a rechargeable battery having the electrode assembly.

An electrode assembly for a rechargeable battery according to one embodiment of the present invention includes: a first electrode; a second electrode; a first separator between the first electrode and the second electrode, the first separator having a plurality of first pores, each of the first pores elongated in a first direction; and a second separator on an opposite side of the first electrode from the first separator, the second separator having a plurality of second pores, each of the second pores elongated in a second direction crossing the first direction.

In one embodiment, the first direction is substantially perpendicular to the second direction.

In one embodiment, the first electrode, the first separator, the second electrode, and the second separator are stacked or wound together about an axis. The first direction may be substantially perpendicular to the second direction.

In one embodiment, the first electrode, the first separator, the second electrode, and the second separator are stacked and wound together about an axis. The first direction may be substantially parallel to the axis. Each of the first and second directions may be at an oblique angle with respect to the axis. The electrode assembly may have a shape of a cylinder having a generally elliptical or circular cross-section through the axis.

In one embodiment, first pores of the plurality of first pores and second pores of the plurality of second pores have a generally elliptical shape.

In one embodiment, first pores of the plurality of first pores have lengths in the first direction greater than widths in a direction substantially perpendicular to the first direction, and second pores of the plurality of second pores have lengths in the second direction greater than widths in a direction substantially perpendicular to the second direction.

In one embodiment, first pores of the plurality of first pores overlap second pores of the plurality of second pores at overlapping regions. The rechargeable battery may include electrolyte, the first pores and the second pores may have non-overlapping regions that do not overlap with each other, and the separators may be configured to contain a greater amount of the electrolyte at the non-overlapping regions than at the overlapping regions.

In one embodiment, the first electrode includes a plurality of first electrodes and the second electrode includes a plurality of second electrodes, each of the first electrodes being separated from an adjacent one of the second electrodes by the first separator or the second separator.

In one embodiment, first pores of the plurality of first pores have sizes and/or shapes different from those of second pores of the plurality of second pores.

A rechargeable battery according to one embodiment of the present invention includes: a case having an opening; an electrode assembly in the case and including a first electrode; a second electrode; a first separator between the first electrode and the second electrode, the first separator having a plurality of first pores, each of the first pores elongated in a first direction; and a second separator on an opposite side of the first electrode from the first separator, the second separator having a plurality of second pores, each of the second pores elongated in a second direction crossing the first direction; and a cap plate closing the opening to seal the electrode assembly in the case.

In one embodiment, a rechargeable battery further includes a first terminal electrically coupled to the first electrode and extending from inside of the case to outside of the case through the cap plate, and a second terminal electrically coupled to the second electrode and extending from inside of the case to outside of the case through the cap plate.

In one embodiment, the first direction is substantially perpendicular to the second direction.

In one embodiment, the first electrode, the first separator, the second electrode, and the second separator may be stacked or wound together about an axis. The first direction may be substantially perpendicular to the second direction.

In one embodiment, the first electrode, the first separator, the second electrode, and the second separator are stacked and wound together about an axis. The first direction may be substantially parallel to the axis. Each of the first and second directions may be at an oblique angle with respect to the axis. The electrode assembly may have a shape of a cylinder having a generally elliptical or circular cross-section through the axis.

In one embodiment, first pores of the plurality of first pores and second pores of the plurality of second pores have a generally elliptical shape.

In one embodiment, first pores of the plurality of first pores have lengths in the first direction greater than widths in a direction substantially perpendicular to the first direction, and second pores of the plurality of second pores have lengths in the second direction greater than widths in a direction substantially perpendicular to the second direction.

In one embodiment, first pores of the plurality of first pores overlap second pores of the plurality of second pores at overlapping regions. The rechargeable battery may further include electrolyte in the case, the first pores and the second pores may have non-overlapping regions that do not overlap with each other, and the separators may be configured to contain a greater amount of the electrolyte at the non-overlapping regions than at the overlapping regions.

According to aspects of another embodiment of the present invention, an electrode assembly includes a positive electrode where a positive electrode active material is coated on a positive electrode current collecting body, a negative electrode where a negative electrode active material is coated on a negative electrode current collecting body, a first separator that has a first pore extended in a first direction and is disposed between the positive electrode and the negative electrode, and a second separator spaced at a distance from the first separator on an opposite side of the positive electrode or the negative electrode and having a second pore extended in a second direction that crosses the first direction.

The first direction and the second direction may be perpendicular to each other, and the electrode assembly may be formed by sequentially stacking the positive electrode, the first separator, the negative electrode, and the second separator and spirally winding them with respect to a spiral rotation axis.

The first direction may be perpendicular to the spiral rotation axis, and may be inclined, or oblique, to the spiral rotation axis. In addition, the electrode assembly may be formed by alternately stacking a plurality of positive and negative electrodes, and interposing the first separator and/or the second separator therebetween.

According to aspects of another embodiment of the present invention, a rechargeable battery includes an electrode assembly, a case in which the electrode assembly is installed, and a terminal electrically connected to the electrode assembly and exposed to an external side of the case, the electrode assembly including a positive electrode where a positive electrode active material is coated on a positive electrode current collecting body, a negative electrode where a negative electrode active material is coated on a negative electrode current collecting body, a first separator disposed between the positive and negative electrodes and having a first pore extended in a first direction, and a second separator spaced at a distance from the first separator on an opposite side of the positive electrode or the negative electrode and having a second pore extended in a second direction that crosses the first direction.

The first direction and the second direction may be perpendicular to each other, and the electrode assembly may be formed by sequentially stacking the positive electrode, the first separator, the negative electrode, and the second separator and spirally winding them with respect to a spiral rotation axis.

The first direction may be perpendicular to the spiral rotation axis, and may be inclined, or oblique, to the spiral rotation axis. In addition, the electrode assembly may be formed by alternately stacking a plurality of positive and negative electrodes, interposing the first separator and/or the second separator therebetween.

According to aspects of exemplary embodiments of the present invention, a direction of a pore formed in the first separator and a direction of a pore formed in the second separator are different from each other for facilitating electrolyte solution replacement. Further, a stable output of a rechargeable battery may be provided and life span of the rechargeable battery may be improved.

BRIEF DESCRIPTION OF THE DRAWINGS

These and/or other features and aspects of the present invention will become apparent and more readily appreciated from the following description of some exemplary embodiments, taken in conjunction with the accompanying drawings.

1. DESCRIPTION OF REFERENCE NUMERALS INDICATING SOME ELEMENTS IN THE DRAWINGS

100: rechargeable battery
10: electrode assembly
11: positive electrode
11a: positive electrode current collecting body
11b: positive electrode active material layer
11c: positive electrode uncoated region
12: negative electrode
12a: negative electrode current collecting body
12b: negative electrode active material layer
12c: negative electrode uncoated region
13: first separator
13a, 14a: pore
13aa, 14aa: overlapping region
13ab, 14ab: non-overlapping region
14: second separator
20: case 21: positive electrode terminal
22: negative electrode terminal
25: cap plate
Z1: spiral rotation axis

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In addition, like reference numerals designate like elements throughout the specification.

Figure 1:
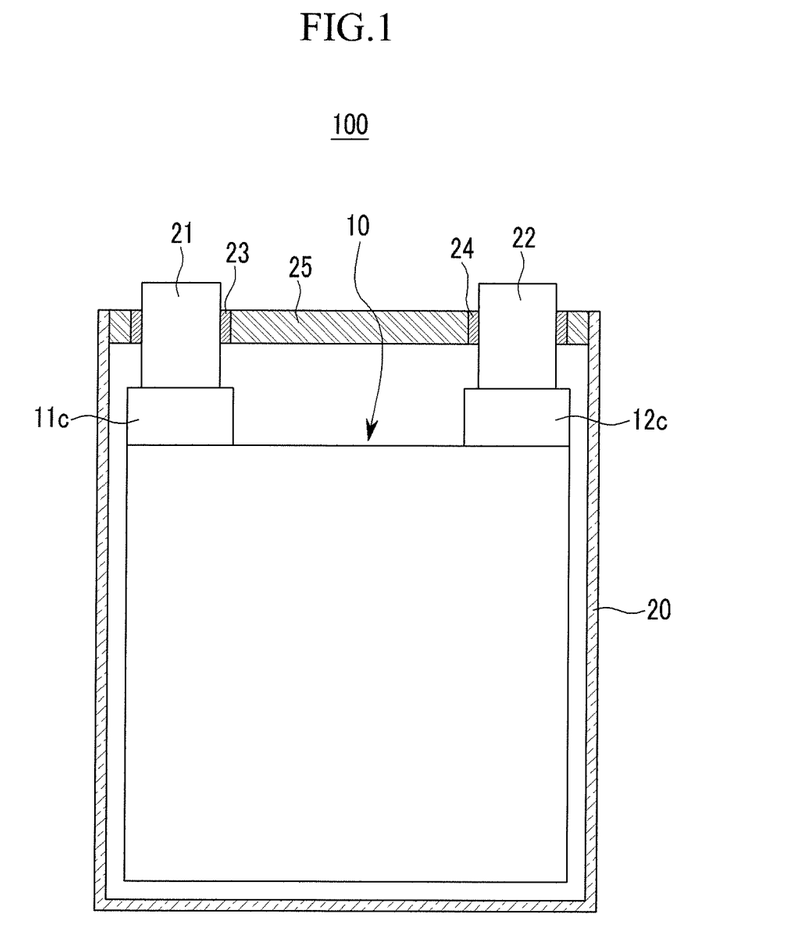
FIG. 1 is a cross-sectional view of a rechargeable battery according to an exemplary embodiment of the present invention.
Figure 2:
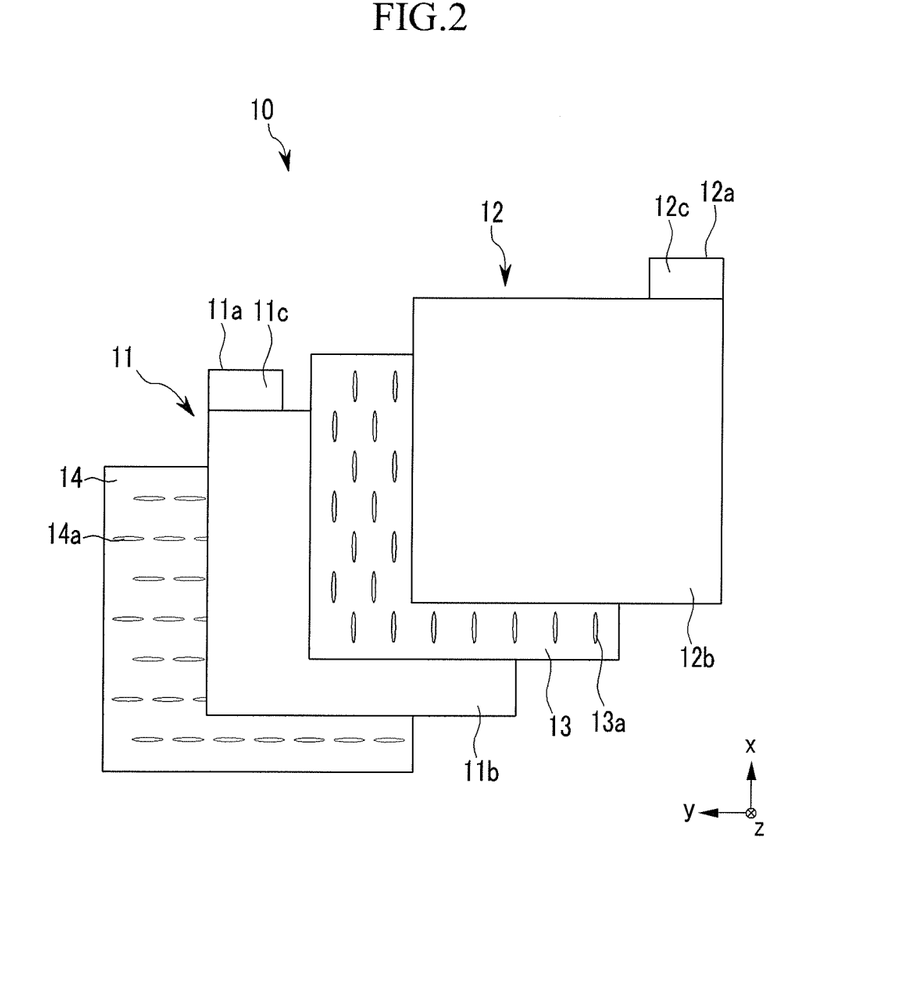
FIG. 2 is an exploded view of an electrode assembly of the rechargeable battery of FIG. 1.

FIG. 1 is a cross-sectional view of a rechargeable battery according to an exemplary embodiment of the present invention, and FIG. 2 is an exploded perspective view of an electrode assembly of the rechargeable battery of FIG. 1.

Referring to FIGS. 1 and 2, a rechargeable battery 100 includes an electrode assembly 10 that performs charging and discharging, a case 20 in which the electrode assembly 10 is installed, or contained, and a cap plate 25 covering, or closing, the case 20.

The case 20 forms the exterior of the rechargeable battery 100 and provides a space for installing the electrode assembly 10. For example, the case 20, in one embodiment, has a prismatic rectangular pouch shape having an opening in one side thereof for receiving the electrode assembly 10 having a corresponding rectangular shape. Alternatively, the case 20, as well as the electrode assembly 10, may have any other suitable shape. In addition, the case 20, in one embodiment, is made of a metal such as aluminum, an aluminum alloy, nickel-plated steel, or any other suitable material, or alternatively may be made of a laminate film forming a pouch.

The cap plate 25, in one embodiment, has a plate shape and is coupled to the case 20 to close, or seal, the opening formed in the case 20.

A positive electrode terminal 21 and a negative electrode terminal 22, in one embodiment, are electrically connected to the electrode assembly 10, and the positive electrode terminal 21 and the negative electrode terminal 22 protrude outside the case 20. The positive electrode terminal 21 is electrically connected to a positive electrode uncoated region 11c, and the negative electrode terminal 22 is electrically connected to a negative electrode uncoated region 12c.

The positive electrode terminal 21 and the negative electrode terminal 22, in one embodiment, penetrate the cap plate 25 and protrude outside the case 20, and gaskets 23 and 24 are located between the positive electrode terminal 21 and the cap plate 25 and between the negative electrode terminal 22 and the cap plate 25, respectively.

The electrode assembly 10 according to one embodiment, as shown in FIG. 2, includes a positive electrode 11, a negative electrode 12, a first separator 13 disposed between the positive and negative electrodes 11 and 12 and having a pore 13a extended, or elongated, in a first direction, and a second separator 14 disposed between the positive and negative electrodes 11 and 12 and having a pore 14a extended, or elongated, in a second direction that crosses the first direction. For example, the pores 13a and 14a, in one embodiment, are elongated in the first direction and the second direction, respectively, and have a generally elliptical shape. Alternatively, the pores 13a and 14a may have any other suitable shapes and/or sizes, and may have shapes and/or sizes different from each other.

The electrode assembly 10, in one embodiment, has a structure in which the positive electrode 11, the first separator 13, the negative electrode 12, and the second separator 14 are alternately stacked. In one embodiment, the electrode assembly 10 includes a plurality of positive electrodes 11 and/or a plurality of negative electrodes 12.

The positive electrode 11 or the negative electrode 12 is disposed between the first and second separators 13 and 14, and the second separator 14 is spaced at a distance from the first separator 13 at an opposite side of the positive electrode 11 or the negative electrode 12. The positive electrode 11 and the negative electrode 12 are alternately disposed between the first separator 13 and the second separator 14. In addition, the first separator 13 or the second separator 14 is disposed between the positive electrode 11 and the negative electrode 12, and the first separator 13 or the second separator 14 is alternately disposed between the positive electrode 11 and the negative electrode 12.

The positive electrode 11, in one embodiment, is formed in a structure where a positive electrode active material layer 11b is coated on a positive electrode current collecting body 11a, the positive electrode current collecting body 11a being formed in a substantially square or rectangular plate shape, and being made of a material such as aluminum, stainless steel, or any other suitable material. The positive electrode active material layer 11b, in one embodiment, is made of $LiCoO_2$, $LiMnO_2$, $LiFePO_4$, $LiNiO_2$, $LiMn_2O_4$, a carbon-based active material, a trivalent active material, a conductive agent, a binder, or any other suitable material. The positive electrode active material layer 11b, in one embodiment, is not formed on an upper end of the positive electrode 11, and a positive electrode uncoated region 11c at which the current collecting body 11a is exposed is formed thereon.

The negative electrode 12, in one embodiment, has a structure in which a negative electrode active material layer 12b is coated on a negative electrode current collecting body 12a, the negative electrode current collecting body 12a being formed in a substantially square or rectangular plate shape, and being made of a material such as copper, stainless steel, aluminum, or any other suitable material. The negative electrode active material layer 12b, in one embodiment, is made of $Li_4Ti_5O_{12}$, a carbon-based material, a conductive agent, a binder, or any other suitable material. The negative electrode active material layer 12b, in one embodiment, is not formed on an upper end of the negative electrode 12, and a negative electrode uncoated region 12c at which the current collecting body 12a is exposed is formed thereon.

The first separator 13 and the second separator 14, in one embodiment, are made of a porous material, such as a polyolefin-based single or complex film such as polyethylene, polypropylene, or a manila paper.

The pore 13a extended in the first direction is formed in the first separator 13, and the first direction, in one embodiment, refers to the x-axis direction shown in FIG. 2. The pore 14a extended in the second direction that crosses the first direction is formed in the second separator 14, and the second direction, in one embodiment, refers to the y-axis direction shown in FIG. 2. For example, in the shown embodiment, the x-axis direction and the y-axis direction are perpendicular to each other.

In the embodiment shown, the first direction and the second direction are perpendicular, or substantially perpendicular, to each other, but the present invention is not limited thereto. For example, in another embodiment, the first direction and the second direction may cross each other at another angle, such as an oblique angle.

Figure 3:
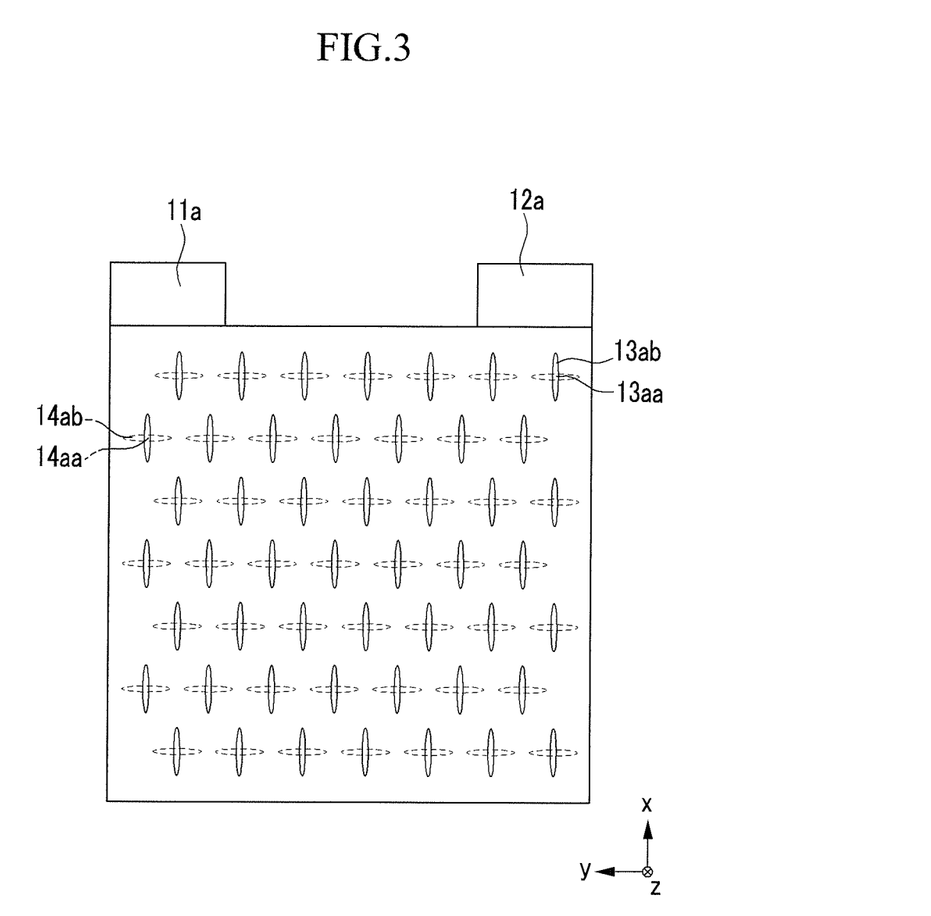
FIG. 3 is a top plan view of the electrode assembly of FIG. 2.

In the stacked electrode assembly 10 according to one embodiment, as shown in FIG. 3, the pore 13a of the first separator 13 and the pore 14a of the second separator 14 cross each other, and the pore 13a of the first separator 13 includes an overlapped, or overlapping, region 13aa overlapped with the pore 14a of the second separator 14 and a single, or non-overlapping, region 13ab not overlapped with the pore 14a of the second separator 14. In addition, the pore 14a of the second separator includes an overlapped, or overlapping, region 14aa overlapped with the pore 13a of the first separator 13 and a single, or non-overlapping, region 14ab not overlapped with the pore 13a of the first separator 13.

As described, according to embodiments of the present invention, the pores 13a and 14a of the first and second separators 13 and 14 are formed to cross each other, and a portion where the pores 13a and 14a overlap is reduced such that a sufficient amount of electrolyte solution may be contained in the pores.

Where the pores and are overlapped, the electrolyte solution may be squeezed down through the pores and such that electrolyte solution density is increased in a lower portion of the electrode assembly and decreased in an upper portion thereof over the passage of time. When the electrolyte solution density in the upper portion of the electrode assembly is decreased, degradation of the electrode assembly is accelerated and life span is shortened.

However, as a result of the pores 13a and 14a crossing each other according to embodiments of the present invention, a greater amount of electrolyte solution is retained in the pores 13a and 14a such that a decrease of the electrolyte solution density in the upper portion of the electrode assembly 10 may be reduced or prevented, and degradation of the electrode assembly 10 may thereby be reduced or minimized.

In addition, when pressure is applied to the first and second separators 13 and 14 due to expansion of the electrode assembly 10, the amount of electrolyte solution squeezed out through the pores 13a and 14a is significantly reduced compared to that of a conventional electrode assembly. Therefore, because the electrode assembly 10 according to embodiments of the present invention is configured to retain a sufficient amount of electrolyte solution in the separators 13 and 14, a stable output may be provided and degradation of the electrode assembly 10 may be reduced or prevented, thereby improving life span.

In addition, since pressure applied to the separators 13 and 14 is dispersed, melting of the separators 13 and 14 due to increase of internal heat is reduced or prevented so that a likelihood of occurrence of an internal short circuit is decreased. Typically, separators may be melted due to an increase of heat and pressure, and therefore, melting of the separators 13 and 14 according to embodiments of the present invention can be reduced or prevented due to the pressure being dispersed. Accordingly, reliability of the rechargeable battery 100 and the electrode assembly 10 according to embodiments of the present invention is improved.

Figure 4:
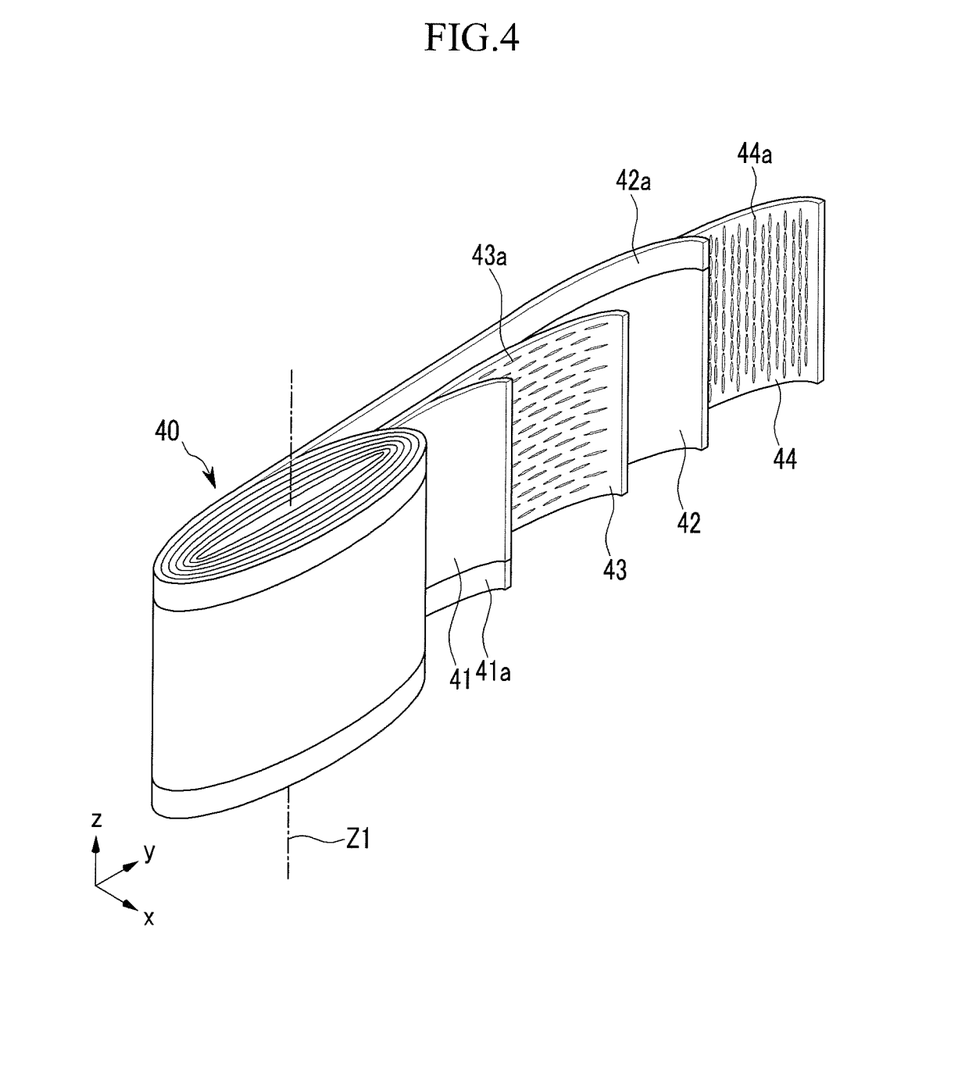
FIG. 4 is a perspective view of an electrode assembly according to another exemplary embodiment of the present invention.

FIG. 4 is a perspective view of an electrode assembly according to another exemplary embodiment of the present invention.

Referring to FIG. 4, an electrode assembly 40 according to one embodiment includes a positive electrode 41, a negative electrode 42, a first separator 43 disposed between the positive and negative electrodes 41 and 42, and a second separator 44 disposed at an external side of the negative electrode 42, or alternatively, at an external side of the positive electrode 41. In the embodiment shown, the first separator 43 is disposed between the positive electrode 41 and the negative electrode 42, but the present invention is not limited thereto. For example, the second separator 44 may be disposed between the positive electrode 41 and the negative electrode 42, and the first separator 43 may be disposed at an external side of the negative electrode 42 or at an external side of the positive electrode 41.

The electrode assembly 40 is formed in a jelly-roll shape (e.g., by being spirally wound) about a spiral rotation axis Z1 such that the positive electrode 41, the first separator 43, the negative electrode 42, and the second separator 44 are sequentially disposed, or stacked. Further, in one embodiment, the electrode assembly 40 is pressed flat after being spirally wound.

The positive electrode 41, the negative electrode 42, the first separator 43, and the second separator 44, in one embodiment, are formed in a belt shape extended in one direction. A positive electrode uncoated region 41a that is not coated with a positive electrode active material is formed at one side in the one direction of the positive electrode 41, and a negative electrode uncoated region 42a that is not coated with a negative electrode active material is formed at the other side of the negative electrode 42.

A pore 43a extended in the y-axis direction that is perpendicular to the spiral rotation axis Z1 is formed in the first separator 43, and a pore 44a extended in the z-axis direction that is parallel with the spiral rotation axis Z1 is formed in the second separator 44.

Accordingly, the first direction in which the pore 43a formed in the first separator 43 is extended and the second direction in which the pore 44a formed in the second separator 44 is extended cross each other.

In the electrode assembly 40 of FIG. 4, shapes and/or sizes of the pores 43a of the first separator 43 and the pores 44a of the second separator 44 may be deformed (e.g., stretched) due to stress or tension during winding about the spiral rotation axis Z1. Because the pores 43a and the pores 44a are elongated (extended) in different directions with respect to each other, the amount of deformation or stretching is not identical for the pores 43a and the pores 44a. Therefore, the pores 43a may have shapes or sizes that are different from the pores 44a. In other embodiments, the pores of the first separator and the pores of the second separator may have different sizes and/or shapes for reasons other than the stress or tension during winding.

Figure 5:
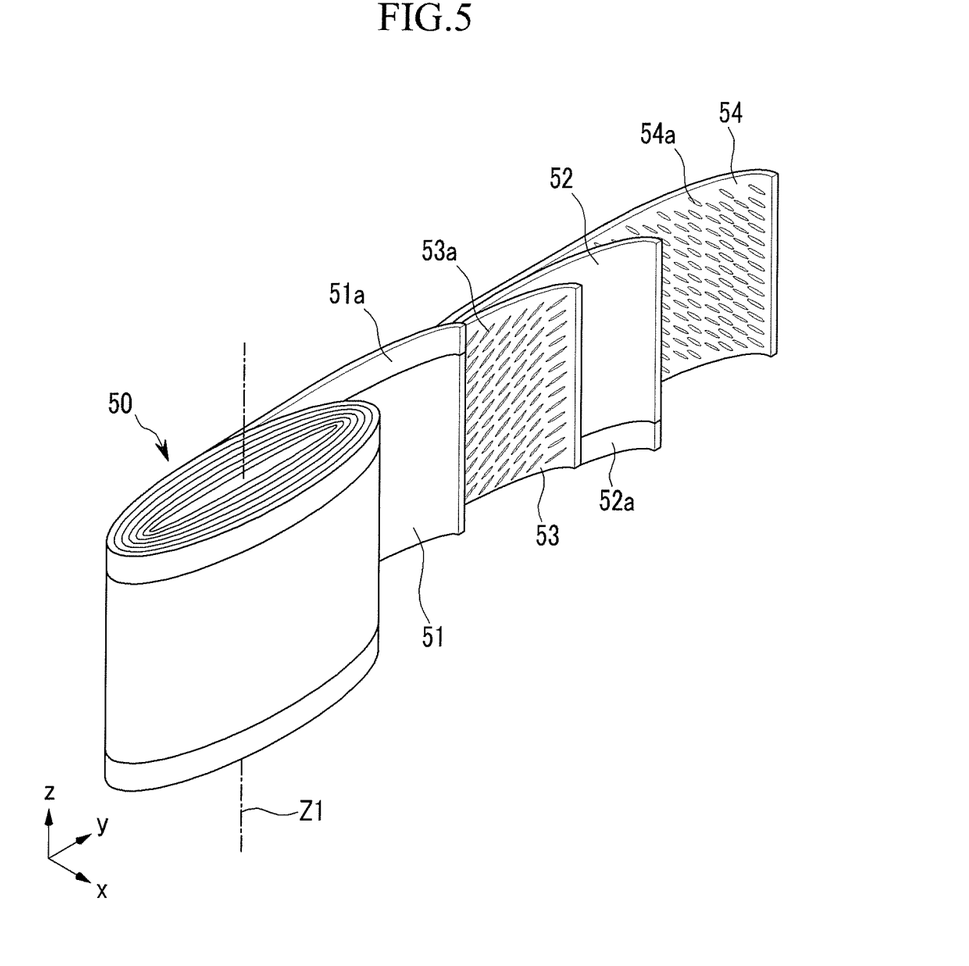
FIG. 5 is a perspective view of an electrode assembly according to another exemplary embodiment of the present invention.

FIG. 5 is a perspective view of an electrode assembly according to another embodiment of the present invention.

Referring to FIG. 5, an electrode assembly 50 according to one embodiment includes a positive electrode 51, a negative electrode 52, a first separator 53 disposed between the positive electrode 51 and the negative electrode 52, and a second separator 54 disposed at an external side of the negative electrode 52, or alternatively, at an external side of the positive electrode 51. In the embodiment shown, the first separator 53 is disposed between the positive electrode 51 and the negative electrode 52, but the present invention is not limited thereto. For example, the second separator 54 may be disposed between the positive electrode 51 and the negative electrode 52, and the first separator 53 may be disposed at an external side of the negative electrode 52 or the positive electrode 51.

The electrode assembly 50 is formed in a jelly-roll shape (e.g., by being spirally wound) about a spiral rotation axis Z1 such that the positive electrode 51, the first separator 53, the negative electrode 52, and the second separator 54 are sequentially stacked. In addition, in one embodiment, the electrode assembly 50 is pressed flat after being spirally wound.

The positive electrode 51, the negative electrode 52, the first separator 53, and the second separator 54, in one embodiment, are formed in a belt shape extended in one direction. A positive electrode uncoated region 51a that is not coated with a positive electrode active material is formed at one side in the one direction of the positive electrode 51, and a negative electrode uncoated region 52a that is not coated with a negative electrode active material is formed at the other side of the negative electrode 52.

A pore 53a extended in a first direction that is inclined, or oblique, with respect to the spiral rotation axis Z1 is formed in the first separator 53, and a pore 54a extended in a second direction that is inclined, or oblique, with respect to the spiral rotation axis Z1 is formed in the second separator 54.

In this case, the second direction is inclined opposite to the first direction so that the first direction and the second direction cross each other. In addition, the second direction, in one embodiment, is perpendicular to the first direction.

Figure 6:
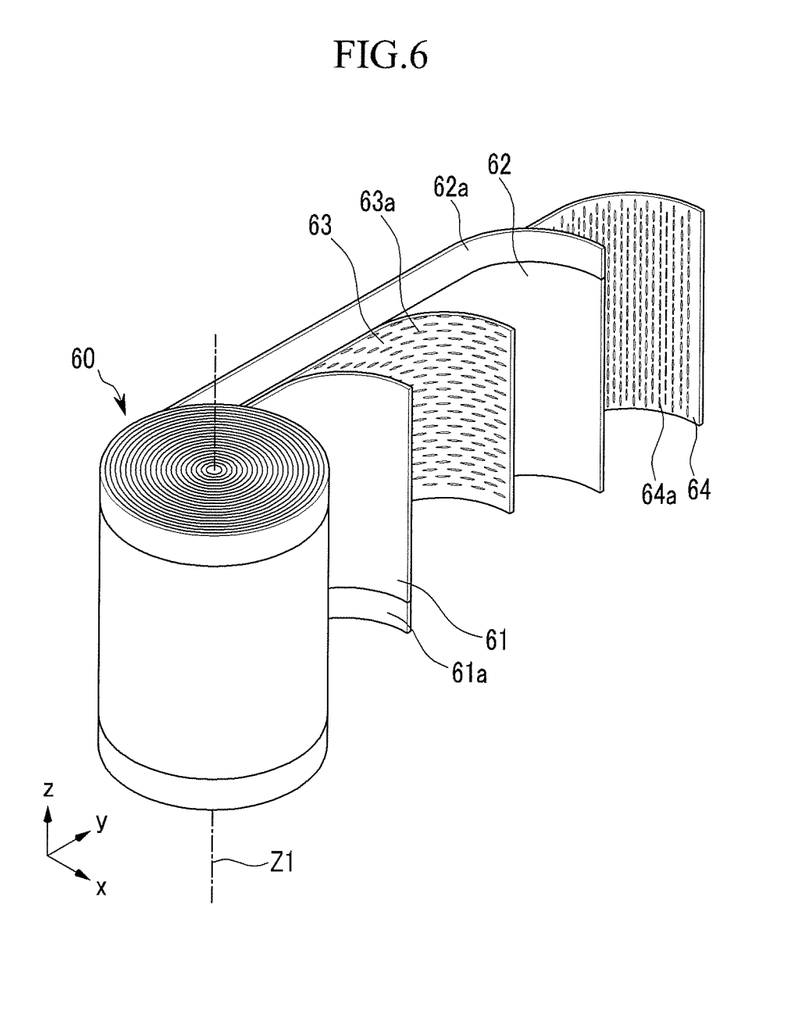
FIG. 6 is a perspective view of an electrode assembly according to another exemplary embodiment of the present invention.

FIG. 6 is a perspective view of an electrode assembly according to another embodiment of the present invention.

Referring to FIG. 6, an electrode assembly 60 according to one embodiment includes a positive electrode 61, a negative electrode 62, a first separator 63 disposed between the positive electrode 61 and the negative electrode 62, and a second separator 64 disposed at an external side of the negative electrode 62, or alternatively, at an external side of the positive electrode 61. In the embodiment shown, the first separator 63 is disposed between the positive electrode 61 and the negative electrode 62, but the present invention is not limited thereto. For example, the second separator 64 may be disposed between the positive electrode 61 and the negative electrode 62, and the first separator 63 may be disposed at an external side of the negative electrode 62 or the positive electrode 61.

The electrode assembly 60 is formed in a cylinder shape (e.g., by being spirally wound) about a spiral rotation axis Z1 such that the positive electrode 61, the first separator 63, the negative electrode 62, and the second separator 64 are sequentially disposed, or stacked.

The positive electrode 61, the negative electrode 62, the first separator 63, and the second separator 64, in one embodiment, are formed in a belt shape extended in one direction, and a positive electrode uncoated region 61a that is not coated with a positive electrode active material is formed at one side of the positive electrode 61 and a negative electrode uncoated region 62a that is not coated with a negative electrode active material is formed at the other side of the negative electrode 62. The uncoated region 61a may be located at any suitable side, or end, of the positive electrode 61, such as the top end, the bottom end, or a side end. Similarly, the uncoated region 62a may be located at any suitable side, or end, of the negative electrode 62, such as the top end, the bottom end, or a side end.

A pore 63a extended in the y-axis direction that is perpendicular to the spiral rotation axis Z1 is formed in the first separator 63, and a pore 64a extended in the z-axis direction that is parallel with the spiral rotation axis Z1 is formed in the second separator 64.

Accordingly, the first direction in which the pore 63a formed in the first separator 63 is extended and the second direction in which the pore 64a formed in the second separator 64 is extended cross each other.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode assembly for a rechargeable battery, the electrode assembly comprising:
a first electrode;
a second electrode;
a first separator between the first electrode and the second electrode, the first separator having a plurality of first pores, each of the first pores elongated in a first direction; and
a second separator on an opposite side of the first electrode from the first separator, the second separator having a plurality of second pores, each of the second pores elongated in a second direction crossing the first direction,
wherein first pores of the plurality of first pores overlap second pores of the plurality of second pores at overlapping regions, and wherein the first pores and the second pores have non-overlapping regions that do not overlap with each other, and
wherein first pores of the plurality of first pores have lengths in the first direction greater than widths in a direction substantially perpendicular to the first direction, and second pores of the plurality of second pores have lengths in the second direction greater than widths in a direction substantially perpendicular to the second direction.

2. The electrode assembly of claim 1, wherein the first direction is substantially perpendicular to the second direction.

3. The electrode assembly of claim 1, wherein the first electrode, the first separator, the second electrode, and the second separator are stacked or wound together about an axis.

4. The electrode assembly of claim 3, wherein the first direction is substantially perpendicular to the second direction.

5. The electrode assembly of claim 1, wherein the first electrode, the first separator, the second electrode, and the second separator are stacked and wound together about an axis.

6. The electrode assembly of claim 5, wherein the first direction is substantially parallel to the axis.

7. The electrode assembly of claim 5, wherein each of the first and second directions is at an oblique angle with respect to the axis.

8. The electrode assembly of claim 5, wherein the electrode assembly has a shape of a cylinder having a generally elliptical or circular cross-section through the axis.

9. The electrode assembly of claim 1, wherein first pores of the plurality of first pores and second pores of the plurality of second pores have a generally elliptical shape.

10. The electrode assembly of claim 1, wherein the rechargeable battery includes electrolyte, and the separators are configured to contain a greater amount of the electrolyte at the non-overlapping regions than at the overlapping regions.

11. The electrode assembly of claim 1, wherein the first electrode comprises a plurality of first electrodes and the second electrode comprises a plurality of second electrodes, each of the first electrodes being separated from an adjacent one of the second electrodes by the first separator or the second separator.

12. The electrode assembly of claim 1, wherein first pores of the plurality of first pores have sizes and/or shapes different from those of second pores of the plurality of second pores.

13. A rechargeable battery comprising:
a case having an opening;

an electrode assembly in the case and comprising:
- a first electrode;
- a second electrode;
- a first separator between the first electrode and the second electrode, the first separator having a plurality of first pores, each of the first pores elongated in a first direction; and
- a second separator on an opposite side of the first electrode from the first separator, the second separator having a plurality of second pores, each of the second pores elongated in a second direction crossing the first direction,
- wherein first pores of the plurality of first pores overlap second pores of the plurality of second pores at overlapping regions, and wherein the first pores and the second pores have non-overlapping regions that do not overlap with each other, and
- wherein first pores of the plurality of first pores have lengths in the first direction greater than widths in a direction substantially perpendicular to the first direction, and second pores of the plurality of second pores have lengths in the second direction greater than widths in a direction substantially perpendicular to the second direction; and
- a cap plate closing the opening to seal the electrode assembly in the case.

14. The rechargeable battery of claim 13, further comprising a first terminal electrically coupled to the first electrode and extending from inside of the case to outside of the case through the cap plate, and a second terminal electrically coupled to the second electrode and extending from inside of the case to outside of the case through the cap plate.

15. The rechargeable battery of claim 13, wherein the first direction is substantially perpendicular to the second direction.

16. The rechargeable battery of claim 13, wherein the first electrode, the first separator, the second electrode, and the second separator are stacked or wound together about an axis.

17. The rechargeable battery of claim 16, wherein the first direction is substantially perpendicular to the second direction.

18. The rechargeable battery of claim 13, wherein the first electrode, the first separator, the second electrode, and the second separator are stacked and wound together about an axis.

19. The rechargeable battery of claim 18, wherein the first direction is substantially parallel to the axis.

20. The rechargeable battery of claim 18, wherein each of the first and second directions is at an oblique angle with respect to the axis.

21. The rechargeable battery of claim 18, wherein the electrode assembly has a shape of a cylinder having a generally elliptical or circular cross-section through the axis.

22. The rechargeable battery of claim 13, wherein first pores of the plurality of first pores and second pores of the plurality of second pores have a generally elliptical shape.

23. The rechargeable battery of claim 13, further comprising electrolyte in the case, wherein the separators are configured to contain a greater amount of the electrolyte at the non-overlapping regions than at the overlapping regions.

* * * * *